US007506800B2

(12) United States Patent
Corso et al.

(10) Patent No.: US 7,506,800 B2
(45) Date of Patent: Mar. 24, 2009

(54) TICKET COUNTER AND CUTTER

(75) Inventors: Steven Corso, Lake Worth, FL (US); Ronald D. Halliburton, Delray Beach, FL (US)

(73) Assignee: Benchmark Entertainment, L.C., Hypoluxo, FL (US)

( * ) Notice: Subject to any disclaimer, the term of this patent is extended or adjusted under 35 U.S.C. 154(b) by 295 days.

(21) Appl. No.: 10/989,449

(22) Filed: Nov. 17, 2004

(65) Prior Publication Data

US 2005/0123334 A1 Jun. 9, 2005

Related U.S. Application Data

(60) Provisional application No. 60/520,317, filed on Nov. 17, 2003.

(51) Int. Cl.
*G06F 17/00* (2006.01)

(52) U.S. Cl. .......................... 235/375; 235/453; 83/345

(58) Field of Classification Search ................. 235/375, 235/454, 253; 83/344–345, 331, 341–343; 225/103, 105
See application file for complete search history.

(56) References Cited

U.S. PATENT DOCUMENTS

| | | | | | |
|---|---|---|---|---|---|
| 3,735,655 | A | * | 5/1973 | Dedona et al. | 83/140 |
| 5,096,407 | A | * | 3/1992 | Nebeling | 425/369 |
| 5,211,093 | A | * | 5/1993 | Horniak | 83/426 |
| 5,630,903 | A | * | 5/1997 | Knorr et al. | 156/472 |
| 5,996,457 | A | * | 12/1999 | Wingeron, Jr. | 83/349 |
| 6,726,077 | B2 | * | 4/2004 | Roberts et al. | 225/103 |
| 6,732,926 | B2 | * | 5/2004 | Shoemaker, Jr. | 235/454 |

* cited by examiner

*Primary Examiner*—Daniel St. Cyr
(74) *Attorney, Agent, or Firm*—Oliff & Berridge, PLC

(57) ABSTRACT

A ticket counter and cutter includes cutting blades, being complementary and in mesh engagement, during operation; at least one bar code reader; and a belt assembly, for receiving a bar coded ticket and advancing the ticket to the bar code reader and then to the cutter.

13 Claims, 10 Drawing Sheets

TICKET COUNTER AND CUTTER

The applicants claim the benefit of U.S. Patent Application No. 60/520,317, filed Nov. 17, 2003, which is relied upon and expressly incorporated by reference herein.

BACKGROUND

This invention relates to a device for counting and shredding tickets. A popular class of amusement games found in family amusement centers and other arcade establishments are redemption games that provide tickets to players that may be redeemed for merchandise. Most redemption games require the exercise of skill. If a player skillfully plays a game, he or she is rewarded with a number of tickets that will reflect or correspond to the score achieved. In some circumstances additional tickets are provided as a bonus to the player. The player then proceeds to a redemption area and can redeem his or her tickets for merchandise of corresponding value. In most circumstances the tickets that are provided to the player are made of paper or light grade cardboard. The tickets may be made of other materials such as synthetic resin or cellulose.

In most circumstances the redemption transaction requires an employee of the arcade establishment to manually receive and count the tickets. Further, upon the redemption of the tickets, it is desirable to destroy the tickets so that they cannot later be redeemed. In most circumstances the cash value of a ticket is about one cent. Because the cash value of the tickets is usually very small, the process of counting and destroying the tickets, both time consuming and labor intensive, is disproportionate to the value. In view of the labor involved in the redemption transaction, it is desirable to have systems in place to automate the redemption transaction. There are existing automated ticket counting machines that are commercially available. However, there is room for improvement to the existing technologies.

SUMMARY OF THE INVENTION

The present invention is directed to an improved ticket counter and ticket cutting device. The device has a self sharpening roller cutter and the motor that engages and drives the tickets through the cutting surfaces is a stepper motor. As tickets pass through the passage to the cutter they are scanned by a barcode readers that scans both sides of the tickets. The device further includes an optical sensor.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

A ticket counter and cutter device, in accordance with embodiments of the invention, may be viewed as comprising a housing and at least three other components, including: (1) Cutter Assembly, (2) Transport Belt Assembly, (3) Top Assembly.

Figure 7:
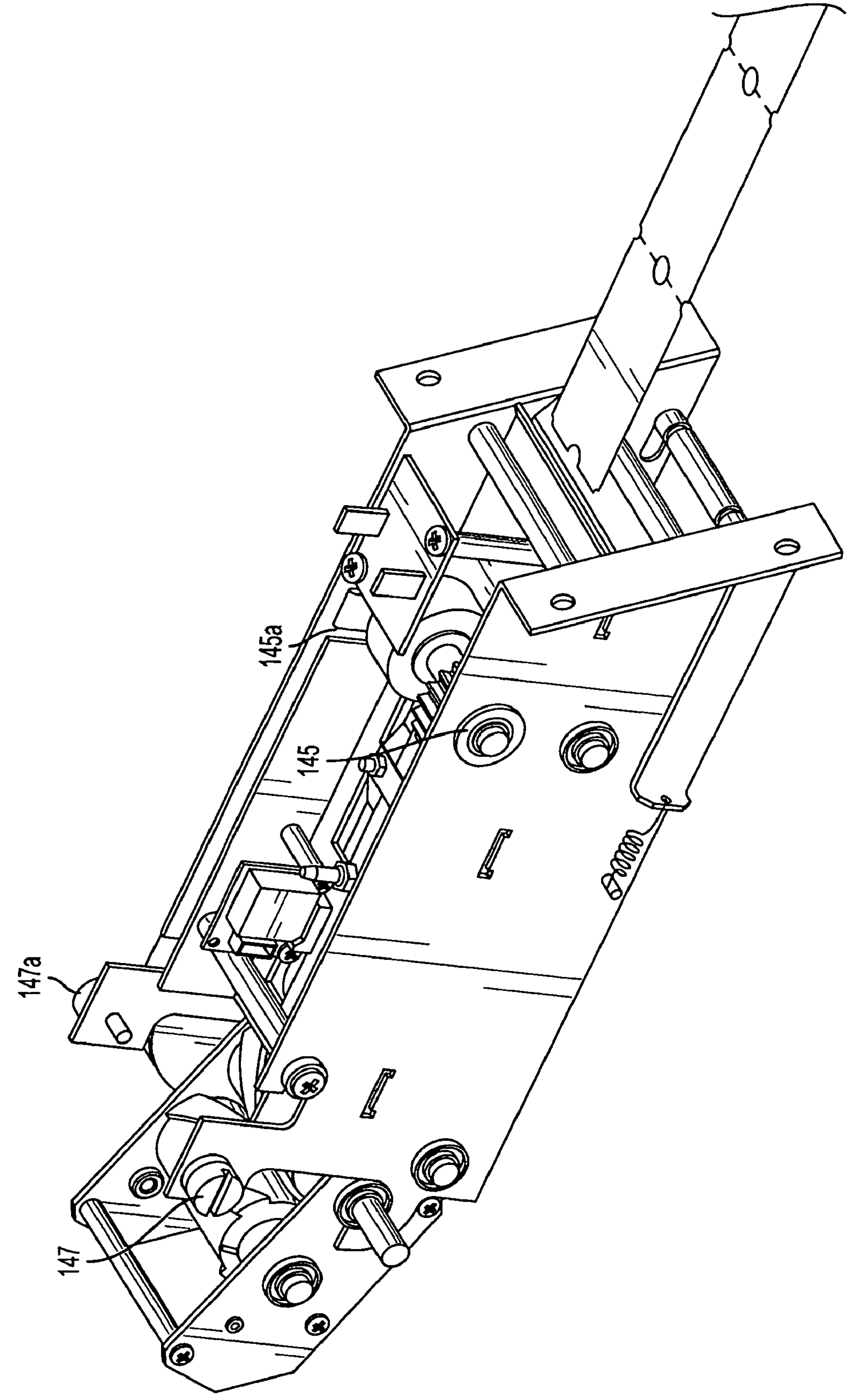
FIG. 7 is a side perspective view depicting the hardware that attaches the top assembly to the bottom assembly.
Figure 8:
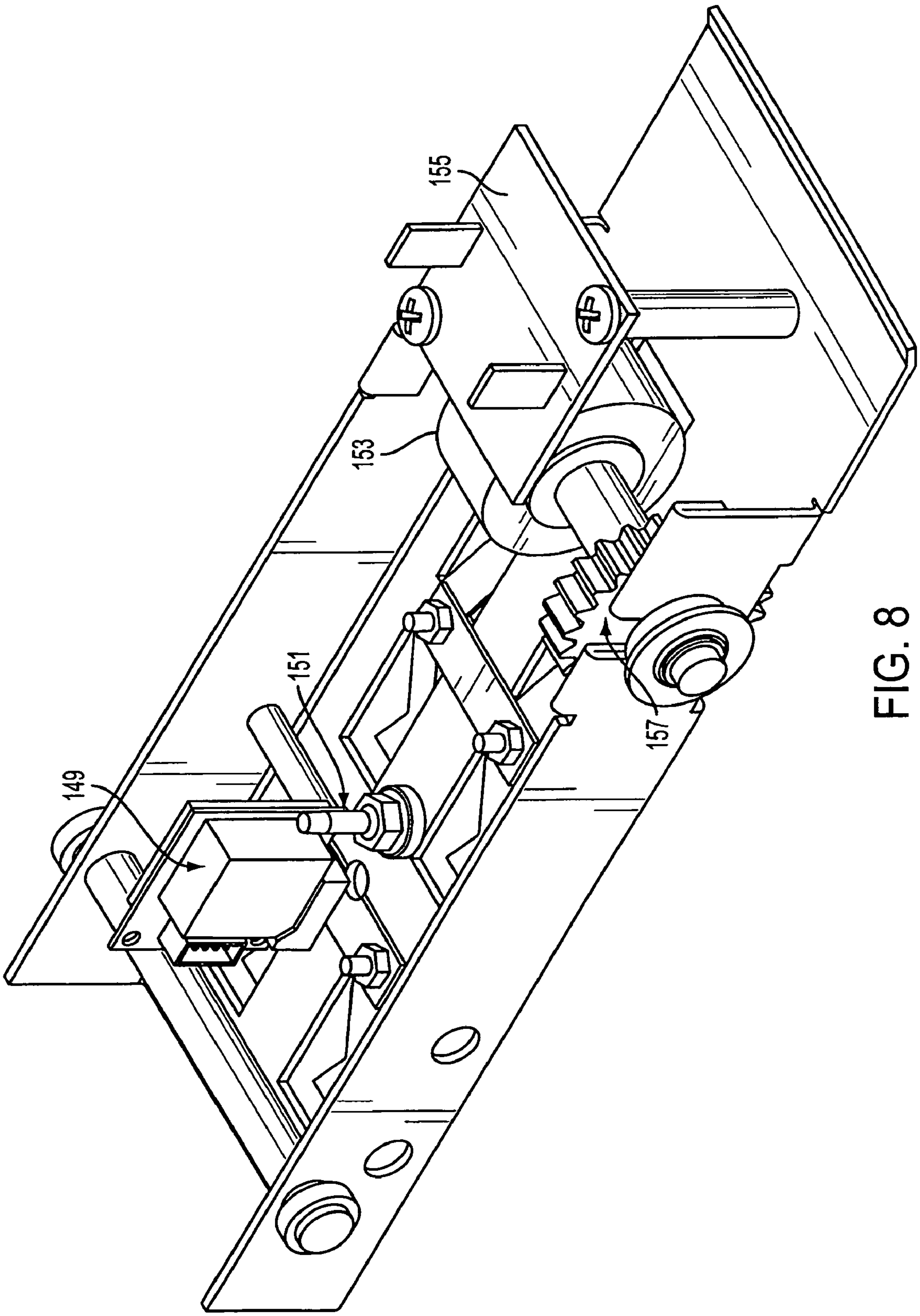
FIG. 8 is a perspective top view of the top assembly.

The ticket counter and cutter assembly can be easily and quickly disassembled without dismounting to expose a jammed ticket or foreign debris which may be causing a problem in the unit. These embodiments of the invention will be illustrated with the following description of the drawings. FIGS. 1-6 relate to the cutter assembly; FIGS. 7-8 relate to the Top Assembly; and FIGS. 9-10 relate to the transport belt assembly.

Self Sharpening Roller Cutter

As can be seen from the appended drawings, a cutter of the invention comprises at least two cutting rollers that work together to cut the tickets as a scissor. The words, cutter, cutter roller, and cutting blades are used interchangeably herein. Each cutter roller is fluted (one left hand and one right hand). The cutting face of the cutters is normal to the concentric axis of the cutter. Since the cutters are always touching face to face and a spring is maintaining face pressure, wear does not affect cutting performance. The cutters are self-sharpening.

The driving cutter has a gear fixed (pressed on) to it. The driven cutter is provided with a gear slip fit onto one end shaft so that it can rotate freely. The gear is provided with a torsion spring, which attaches to that gear to actuate the driven cutter A timing belt pulley is attached to one end of the driving cutter, which is driven by a stepper motor. As the driving cutter turns, it drives the driven cutter by pushing its cutting face against the cutting face of the driven cutter. The driven gear maintains constant cutter face pressure against the driving gear determined by the torsion spring and torsion spring adjustment. One end of the torsion spring is attached to the gear on the driven cutter while the other end is attached to the driven cutter. Torsional tension can be adjusted by rotating the gear before engaging with the gear on the driving cutter.

Figure 1:
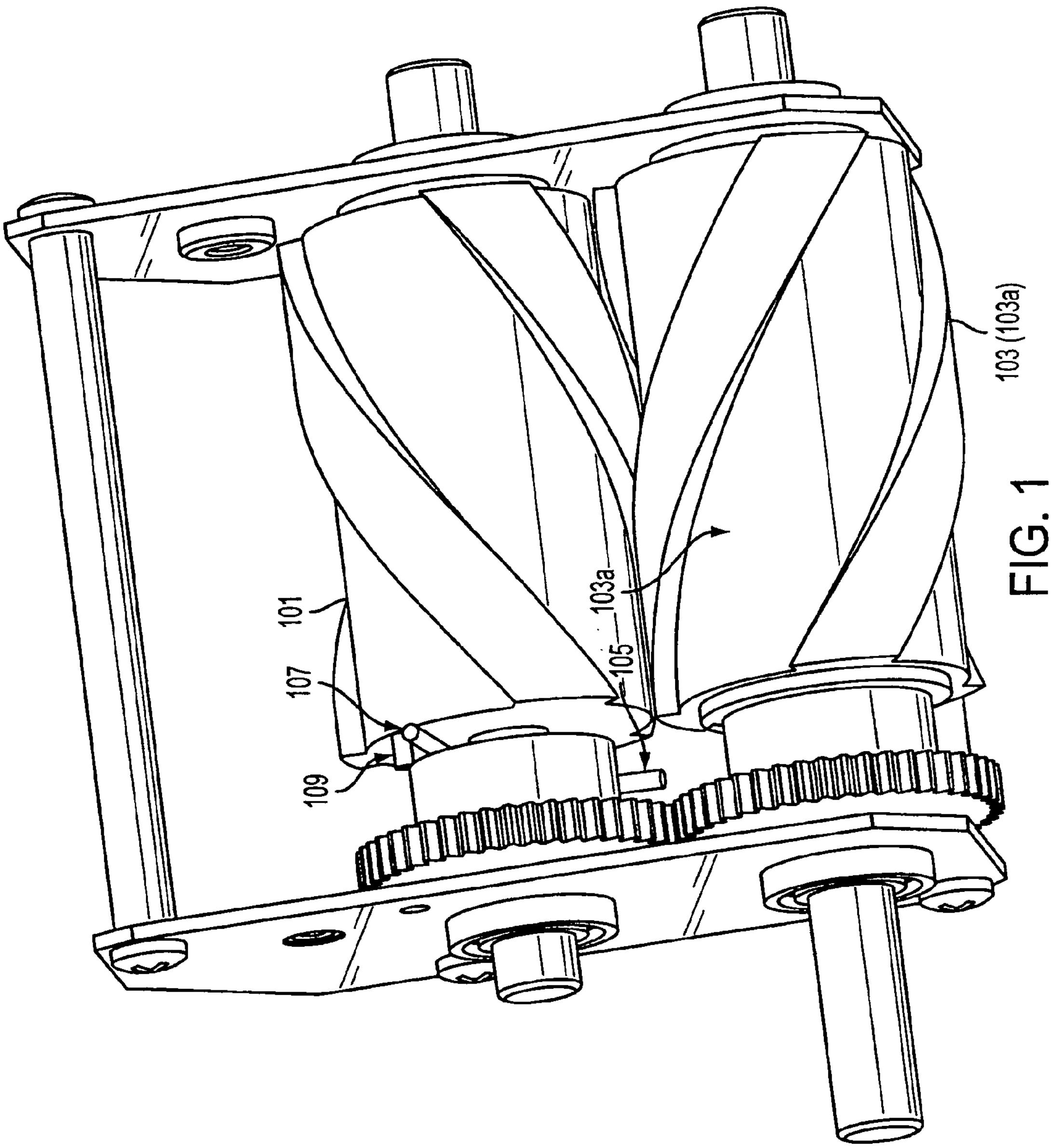
FIG. 1 is a perspective view of the cutting elements of the invention.

Now referring to FIG. 1, opposite complementary cutting blades 101 and 103 are shown. One of the cutting blades 101 and 103 is the driving cutter, while the other is the driven cutter; here cutting blade 103 is designated as the driving cutter 103*a*, and thus cutting blade 101 is the driven cutter. Each cutter comprises a cutting roller that is fluted; however, one of the cutting blades comprises a left hand and one comprises a right hand flute. In FIG. 1, elements 105 and 107 are torsion spring ends. Element 109 is a pin attached to the driven cutter 101.

Figure 2:
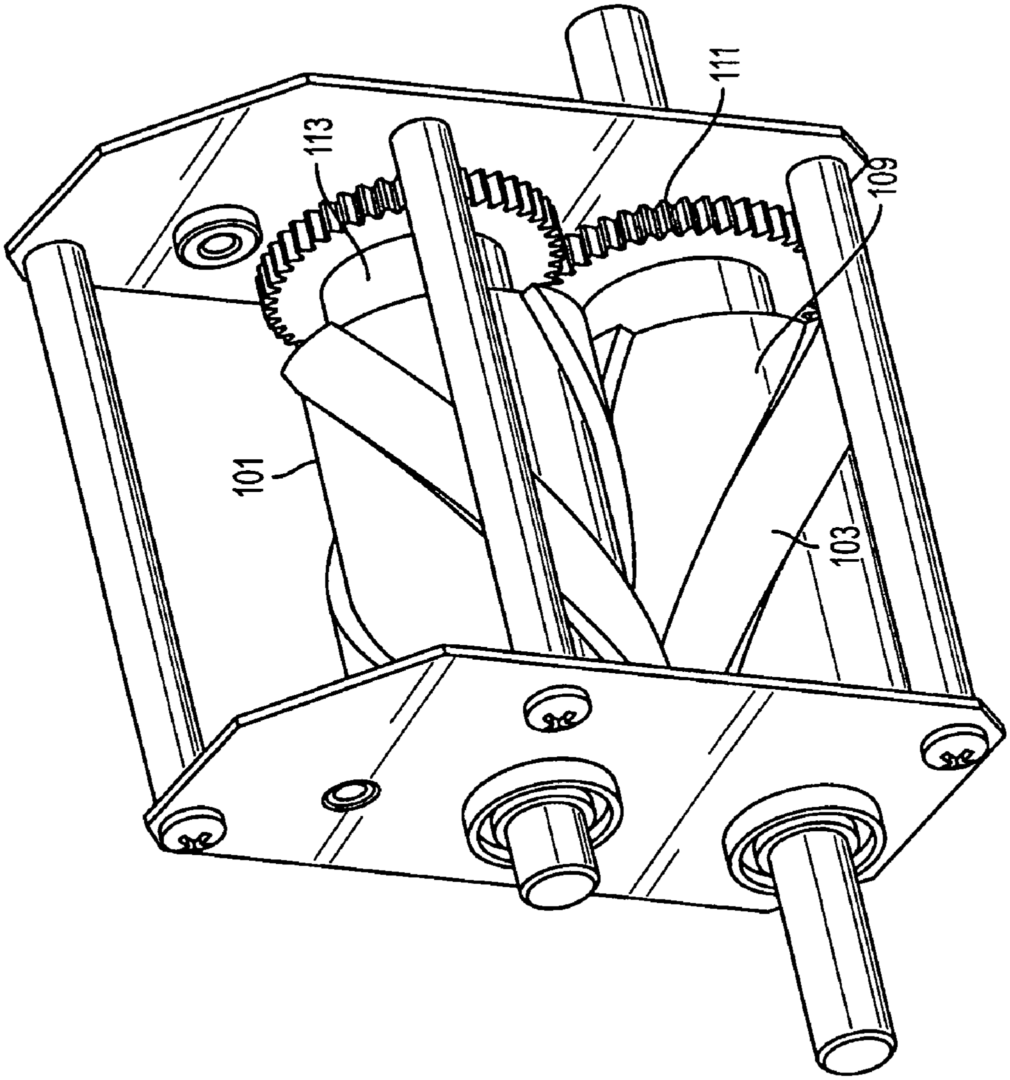
FIG. 2 is a second perspective view of the cutting elements of the invention viewed from the rear.

FIG. 2, a second perspective view of the cutting elements of the invention from the rear, shows elements 101 and 103 and gear 109, which is the driving cutter gear 111; the driving cutter gear 111 is driven by a stepper motor (not depicted.) Driving cutter gear 111 engages with the driven cutter gear 113 [by mesh design].

Figure 3:
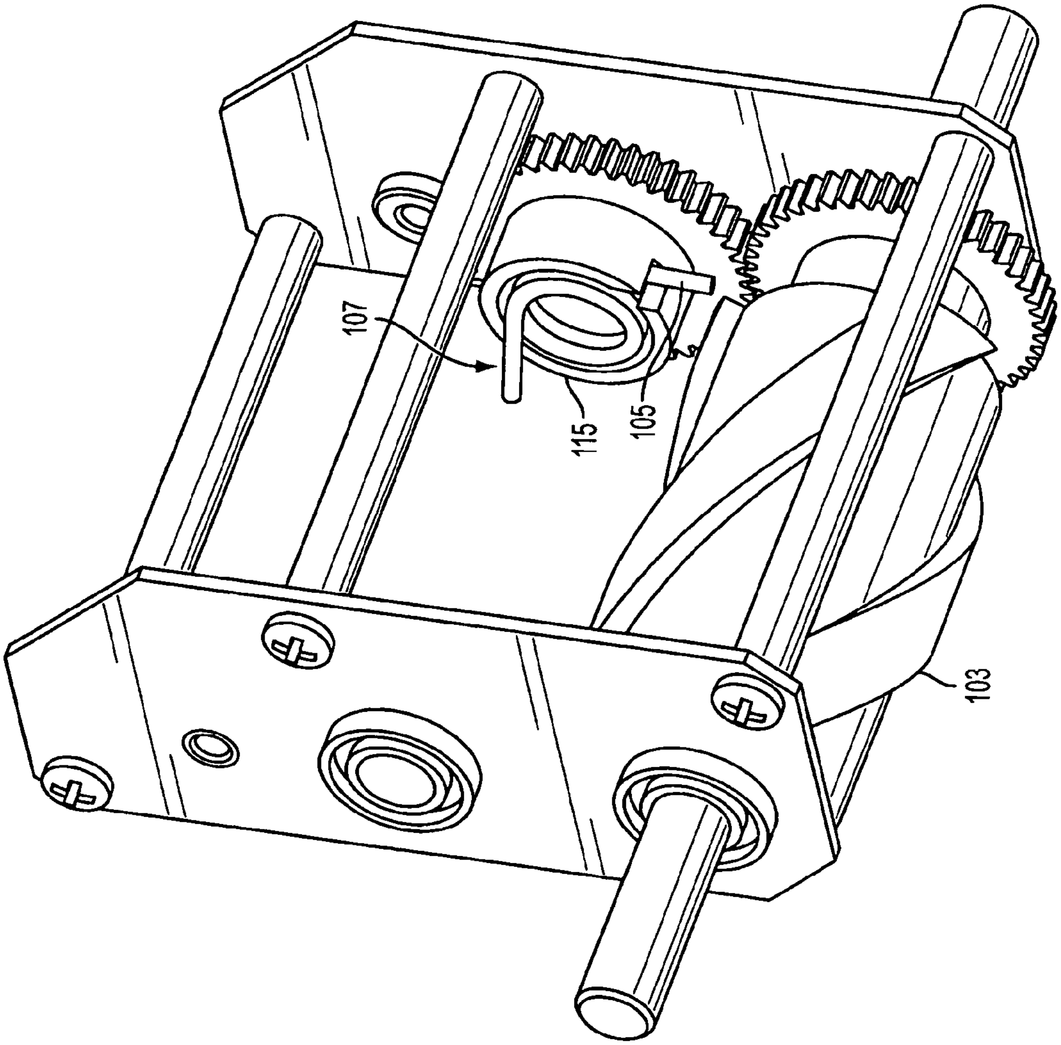
FIG. 3 is a perspective view of one of the cutting elements that shows the torsion spring that provides a bias on the other cutting element.

FIG. 3 is a depiction of the cutter assembly with the driven cutter removed. It shows the torsion spring 115 and torsion ends 105 and 107.

Figure 4:
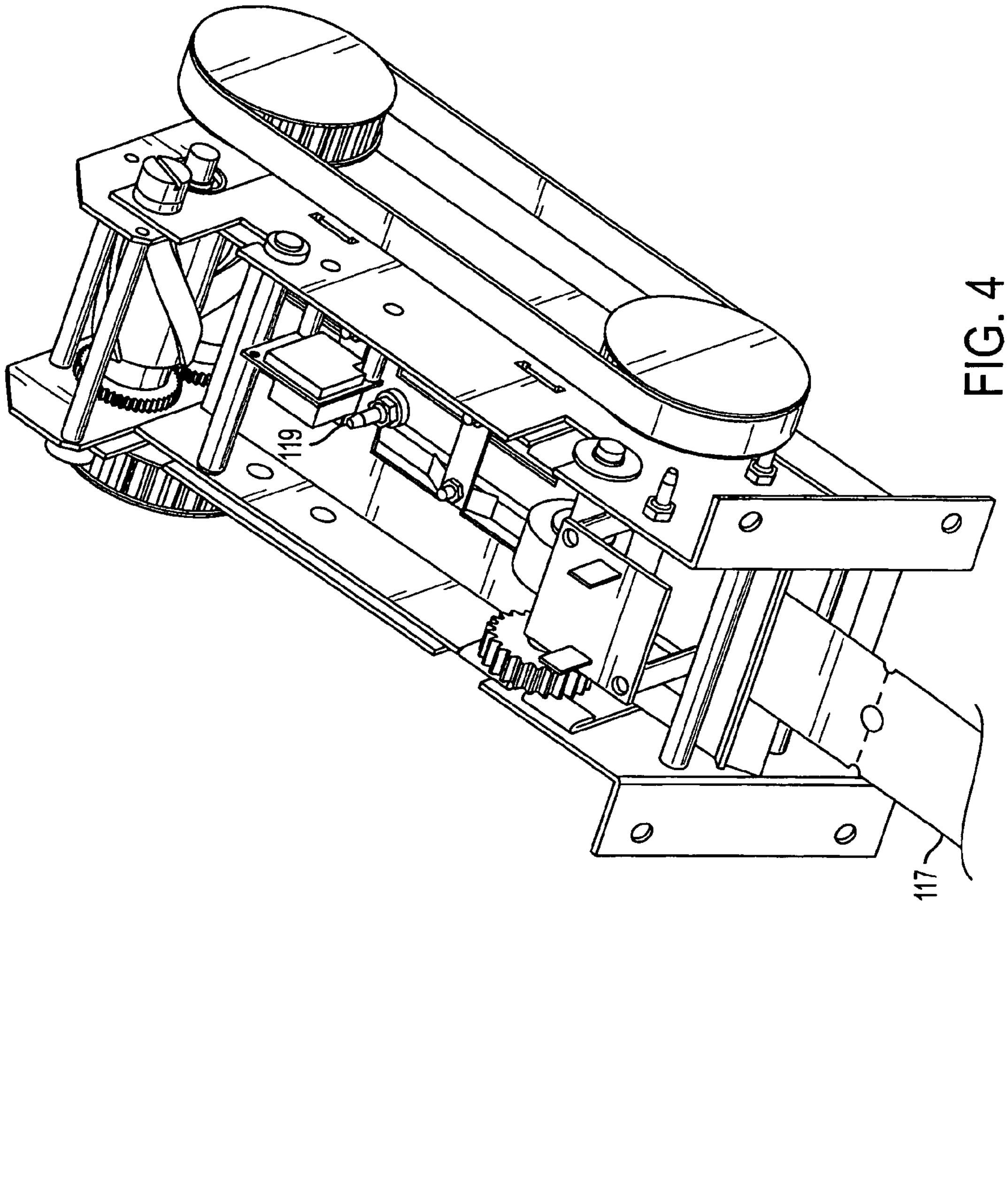
FIG. 4 is a top perspective view of the cutting elements in combination with the ticket reader and driving elements.
Figure 5:
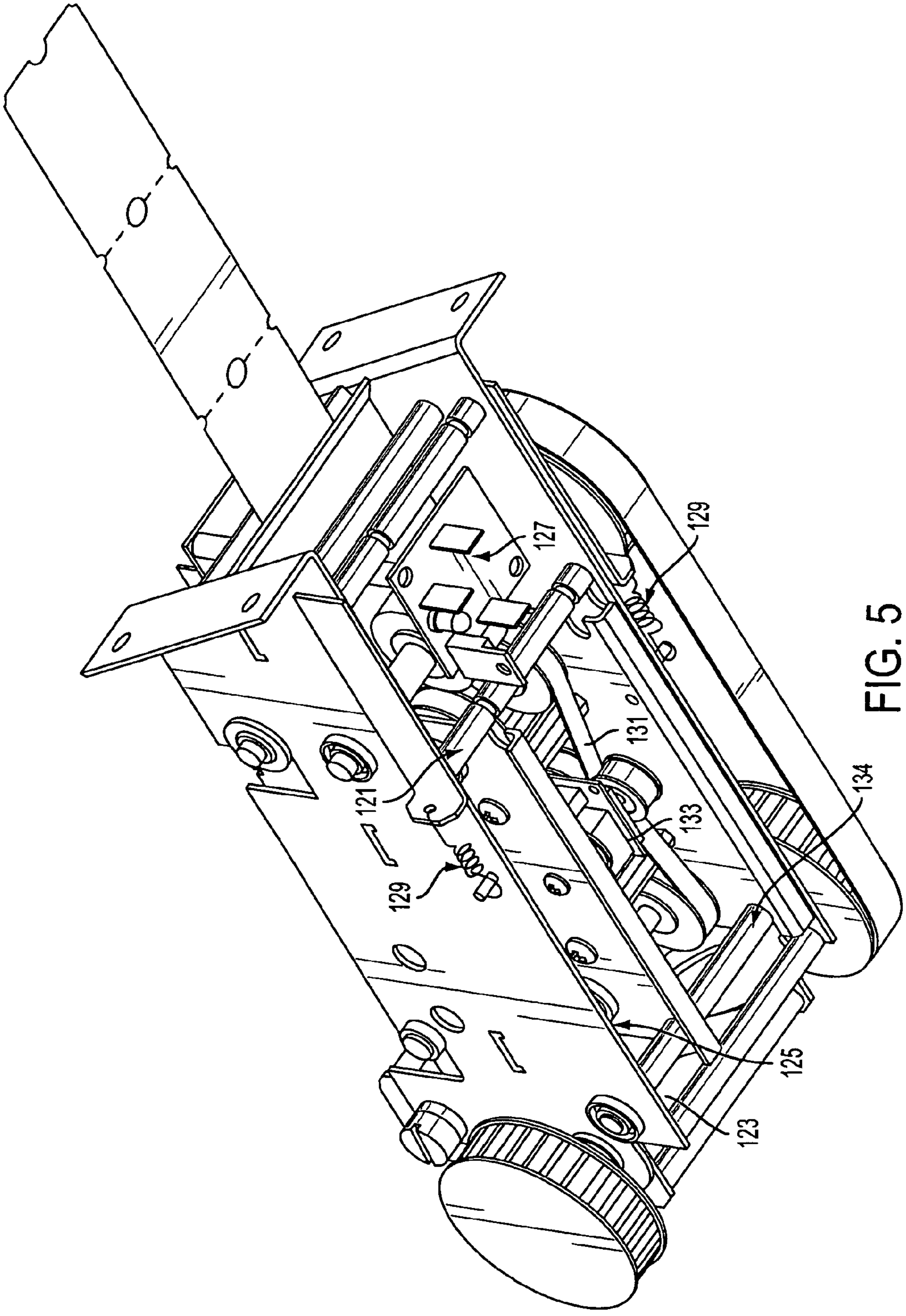
FIG. 5 is a bottom perspective view of the cutting elements in combination with the ticket reader and driving elements of the invention.

FIG. 4 depicts a ticket reader and cutter assembly [top angle view], in accordance with an embodiment of the invention, in which element 117 is a ticket, and element 119 is a gas (air) jet. FIG. 5 presents a bottom perspective view (of the apparatus of FIG. 4) and of the cutting elements in combination with the ticket reader and driving elements. Element 121 is a front capture bar for holding the belt transport assembly; it is shown in a released position. Element 123 is an idler gear. The transport belt assembly drive gear 125 is a gear driven by the cutter gear through the idler gear. Element 127 is the ticket sensing opto receiver. Numeral 129 refers to capture bar springs. The transport belt assembly is designated by 131. The barcode reading PCB is element 133; and the rear capture bar is 134.

Figure 6:
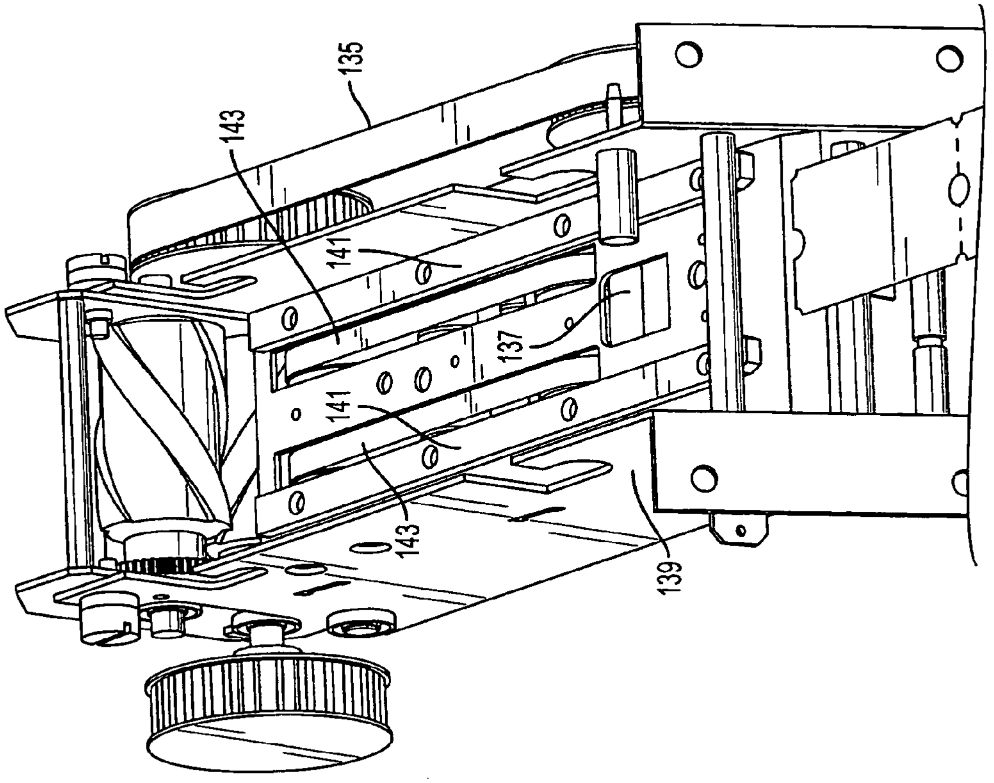
FIG. 6. is a top perspective view of the device with the top portion of the ticket reader assembly removed.

FIG. 6 reveals an embodiment including ticket transport belts 143, ticket guide rails 141, and lower roller gear 139 [hidden] drives an upper roller which is located on top assembly; timing belt 135 (which drives lower roller), and lower roller 137. Tickets are pinched between upper and lower rollers when inserted, then advance over ticket transport belts 143 and between ticket guide rails 141 before entering the cutter assembly.

FIG. 7 is a side perspective view depicting the hardware that attaches the top assembly to the bottom assembly includes the slots 145, and 145*a*, captive thumb screws 147 and 147*a*. In this view the cutter assembly is rotated back so that the top assembly can be slid back and lifted out.

Barcode Using Stepper (or Servo) Motor

A barcode reading circuit board is located on the top side and on the bottom side of an assembly so that tickets with barcode on only one side can be read without requiring the user to insert the tickets with a certain side up. The sensor is a standard circuit that uses a reflective opto sensor to read the lines of a barcode. Traditionally, barcodes are decoded by measuring the width of the pulses in time. This can be difficult in some applications, as it requires that the speed is somewhat constant during a read and often requires a minimum scan speed. The mechanism is driven by a stepper (or servo) motor. In accordance with the invention, the width of a barcode line can be measured independently of speed using steps of the motor. This allows for a very accurate measurement at any speed and allows the operator to vary the speed dramatically in the middle of a barcode scan without any sacrifice in accuracy. Using the stepper (or servo) motor also allows us to know the exact position of the ticket at all times.

Self-Cleaning Air Bursts

Paper dust present in a paper cutting environment contaminates the optics which can degrade performance or shut down operation of a ticket counter and cutter. Existing ticket cutters require manual cleaning of optics in order to maintain counting and barcode reading. The cutter of the invention uses air bursts at predetermined times to clean the optics automatically. There are air jets positioned at every opto sensor used on this unit. After reading a predetermined number of tickets, an air burst can be released to clean the optics of the dust build up. A small air pump can be used to fill a small tank with compressed air. Using an electric air valve, a quick air burst is released to the jets directed at the opto sensors.

FIG. 8 is a perspective top view of the top assembly, showing the barcode reading PCB (upper) 149, the air jet 151, the upper roller 153 and the ticket sensing OPTO transmitter PCB 155, and upper roller gear 157, which is driven by the lower roller gear.

Figure 9:
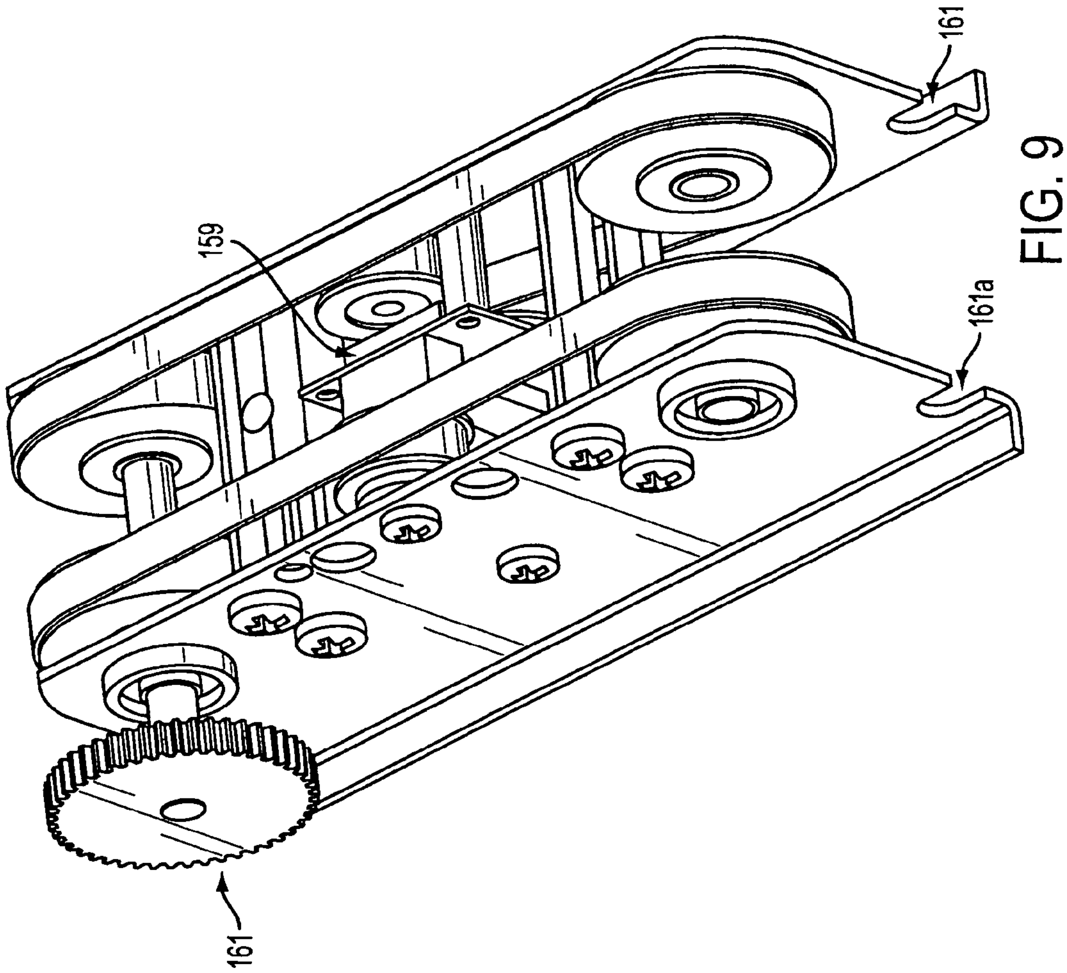
FIG. 9 is a top view of the drive belt assembly that is positioned in the bottom part of the device.

FIG. 9 is a top view of the drive belt assembly which includes barcode reading PCB (lower) 159; transport belt assembly drive gear and slots 161, 161*a* into which the capture bar fits and holds this assembly in place.

Figure 10:
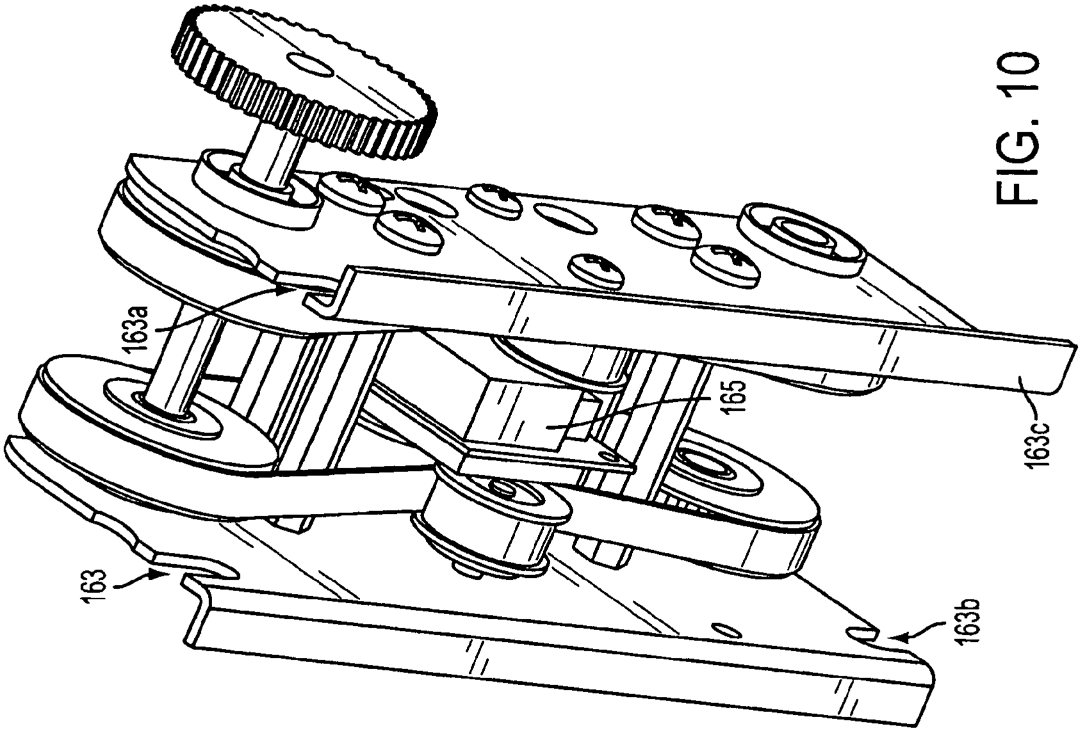
FIG. 10 is a bottom perspective view of the drive belt assembly.

FIG. 10 is a bottom perspective view of the drive belt assembly, which is provided with slots 163, 163*a*, 163*b*, 163*c* and in this view includes the bar code reading PCB (lower); the entire transport belt assembly is mounted with four slots.

Easy Disassembly

As can be seen from FIG. 7, the top assembly can be removed, exposing the entire path of the ticket. This is done by:

1. Loosening two captive thumb screws and rotating the cutter assembly back
2. Pulling the top assembly toward the cutter assembly
3. Lifting the top assembly off The drive gear for the top rollers disengages upon disassembly and re-engages upon re-assembly without notice to the operator. The cutter gear remains engaged as the pivot point is concentric with the gear.

The transport belt assembly can be removed by:

1. Pushing the front capture bar forward against the spring force.
2. Rotating the transport belt assembly on the rear capture bar down and out.

The drive gear for the belt assembly disengages upon disassembly and re-engages upon re-assembly without notice to the operator.

In summary, features and advantages of the ticket counter and cutter of the invention include:

1. Self sharpening roller cutter(s)
2. Stepper (or servo) motor driven
3. Barcode reading both sides of ticket using stepper motor steps to measure each bar width instead of the traditional time method
4. Self cleaning opto sensors-uses air burst after predetermined number of ticket counts to clean each opto from dust resulting from paper cutting
5. Easy disassembly in case of ticket jam The invention has been described with respect to specific embodiments, for the purposes of clarity. Applicants intend the terms of the embodiments to embrace all equivalents and obvious modifications thereof and to be limited only by a broad interpretation of the appended claims.

What is claimed is:

1. A ticket counter and cutter comprising cutting blades, comprising at least two fluted rollers, wherein one of said two rollers has a left handed flute and the other said two rollers has a right handed flute, said flutes being complementary and in mesh engagement, during operation;

at least one optical sensor; and a belt assembly for receiving a ticket, transporting said ticket from first location, past said sensor, sensing said ticket with said sensor, and then introducing said ticket to said cutting blades wherein when said ticket passes through said cutting blades, and said ticket is cut and shredded whereby said ticket is destroyed.

2. The ticket counter and cutter of claim 1, wherein one of said rollers is a driving cutter.

3. The ticket counter and cutter of claim 2, which further comprises a timing belt pulley and a stepper motor, wherein the timing belt pulley is attached to one end of the driving cutter, which is driven by a stepper motor.

4. The ticket counter and cutter of claim 3, which further comprises a driving cutter gear which is actuated by said timing belt and said stepper motor.

5. The ticket counter and cutter of claim 4, which further comprises a transport assembly drive gear, an idler gear, wherein said idler gear meshes with said transport assembly drive gear, and engages directly or indirectly with said driving cutter gear.

6. The ticket counter and cutter of claim 1, wherein one of said roller is a driven cutter which is actuated by said second roller.

7. The ticket counter and cutter of claim 1, wherein said optical sensor further comprises a bar code reader.

8. The ticket cutter recited in claim 1 further comprising means to provide an intermittent blast of air directed to the surface of said sensor, wherein debris from the cutting operation may be removed from said surface of said sensor by said air blast.

9. The device recited in claim 8 wherein said means comprises a compressor, a tank conduit, a jet and a valve.

10. The device as recited in claim 1 wherein said flutes are posited in a helical arrangement on said rollers wherein a leading edge of said first roller intersects with a leading edge of said second roller at a first intersection position and as the rollers are rotated, the location of subsequent intersection positions moves laterally across the surface of said rollers.

11. The device as recited in claim 10 wherein the cutting faces of said rollers are normal to the concentric axis of said cutters.

12. The device as recited in claim 11 wherein said cutting faces on opposite rollers engage one another such that the edges of said faces remain at a sharp angle and are self sharpening.

13. A ticket cutter comprising opposite cutting blades, said opposite cutting blades further comprising flutes located on at least two rollers, wherein said flutes are in a helical orientation on said rollers and one of said two rollers has a left handed flute and the other of said two rollers has a right handed flute, said flutes being complementary and engage one another at a cutting location during operation and further comprising means to introduce tickets to said cutting blades and means to count tickets introduced to said cutter wherein said means to introduce said tickets further comprise a belt assembly wherein said belt assembly receives tickets and carries said tickets to said cutting blades wherein said tickets are cut and destroyed.

* * * * *